United States Patent
Laurent

[19]

[11] Patent Number: 5,889,731
[45] Date of Patent: Mar. 30, 1999

[54] VIBRATION DETECTOR

[75] Inventor: Jean Laurent, Orgeval, France

[73] Assignee: Institut Francais du Petrole, Rueil-Malmaison, France

[21] Appl. No.: 958,871

[22] Filed: Oct. 27, 1997

Related U.S. Application Data

[63] Continuation of Ser. No. 639,526, May 1, 1996, abandoned.

[30] Foreign Application Priority Data

May 4, 1995 [FR] France ................................. 95 05331

[51] Int. Cl.⁶ .............................. G01J 1/38; H04R 17/00
[52] U.S. Cl. ...................... 367/166; 367/160; 367/165; 367/171; 310/337
[58] Field of Search .................... 367/160, 165, 367/171, 173, 166; 310/337

[56] References Cited

U.S. PATENT DOCUMENTS

| | | | |
|---|---|---|---|
| 3,153,156 | 10/1964 | Watlington | 367/160 |
| 3,947,644 | 3/1976 | Uchikawa | 310/334 |
| 4,075,600 | 2/1978 | Sims et al. | 367/160 |
| 4,336,639 | 6/1982 | Berglund | 367/163 |
| 4,536,862 | 8/1985 | Sullivan et al. | 367/153 |
| 4,979,219 | 12/1990 | Lin | 310/324 |
| 5,136,549 | 8/1992 | Berglund | 367/160 |

FOREIGN PATENT DOCUMENTS

| | | |
|---|---|---|
| 1 556 971 | 1/1969 | France . |
| 2 122 675 | 9/1972 | France . |
| 2 090 975 | 7/1982 | United Kingdom . |

*Primary Examiner*—Ian J. Lobo
*Attorney, Agent, or Firm*—Antonelli, Terry, Stout & Kraus, LLP

[57] ABSTRACT

A vibration detector is disclosed. The vibration includes a ring (2) closed at its opposite ends by two ring ends (3, 4), that is externally covered with a sheath (11) made from an elastic material transparent to vibrations, two supporting plates (5) with a flexible central part (6) and a reinforced peripheral part (7) resting on the two ring ends. An inner cavity (8) between the two plates (5) is filled with liquid communicating through ports (10) and sheath (11) with the outside environment. Two sensitive elements (9) such as piezoelectric disks for example are fastened to the flexible central parts (6) on their faces of the interior of the cavity (8). The sensitive elements (9) are well protected from the outside environment and their sensitivity is not substantially influenced by variations in the static pressure. The invention has an application for detection of acoustic or seismic waves.

27 Claims, 1 Drawing Sheet

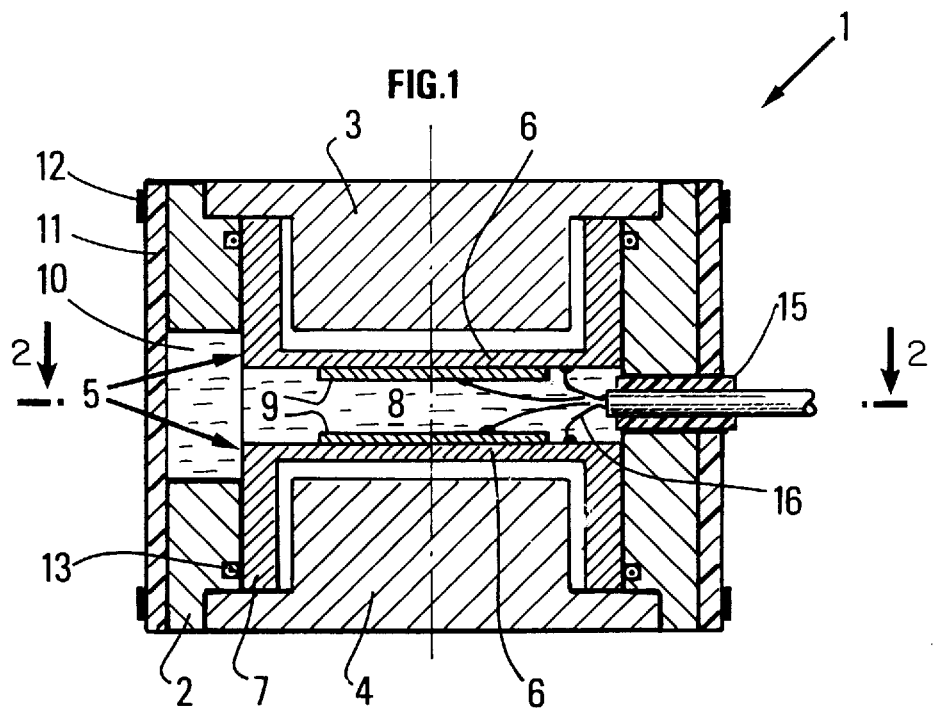
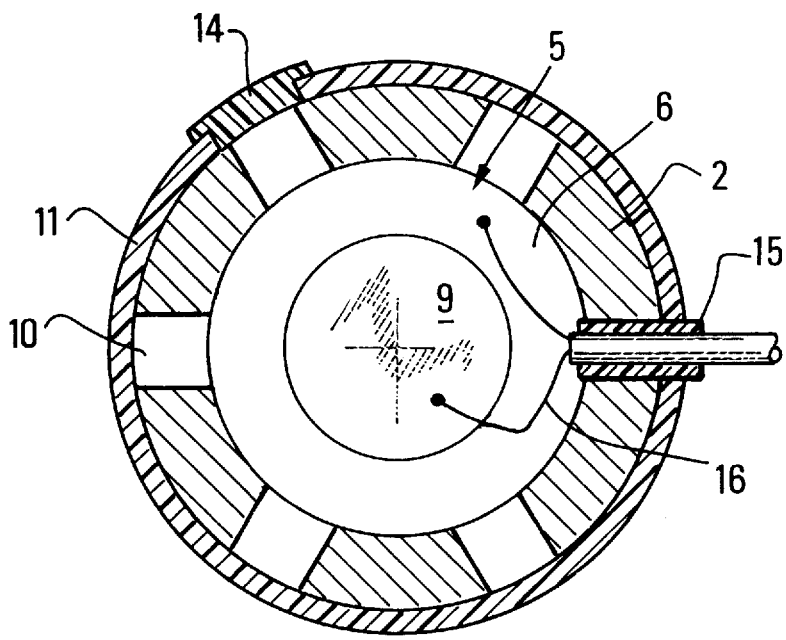

VIBRATION DETECTOR

This application is a Continuation application of application Ser. No. 08/639,526, filed May 1, 1996 abandoned.

BACKGROUND OF THE INVENTION

1. Field of the Invention

The present invention relates to a vibration detector usable notably for the reception of acoustic or seismic waves.

2. Description of the Prior Art

There are well-known vibration detectors comprising at least one sensitive element of piezoelectric type or of another type, fastened to a flexible wall of a housing. This wall is for example the central part of a plate whose peripheral part is reinforced and rigid. The housing can be defined by two analogous plates resting against one another by their thicker peripheral parts and each bearing a sensitive element. The electrodes of the two sensitive elements are interconnected electrically so as to ensure a compensation of the parasitic effects due to accelerations. When the outside static pressure increases, the two plates bend until they rest against one another. The space between them is so selected that their maximum deformation remains within their elastic deformation limits when they are pressed against one another. The detector is thus protected against accidental overpressures.

The sensitive elements can be fastened outside the housing, which gives them a sensitivity that varies little (less than 10% for a static pressure of 10 MPa for example) with the hydrostatic pressure variations. The sensitive elements are generally covered with a protective coating (such as a varnished araldite coat) so as to maintain a sufficient electric insulation between the electrodes. This layout provides very sensitive detectors at a relatively low cost, but their reliability may sometimes deteriorate as a result of the direct exposure of the sensitive elements and of their possible protective coating to the outside environment.

According to another well-known layout, the sensitive elements can be fastened to the plates on the inner faces thereof and therefore inside the housing, which ensures them a better protection against the outside environment. However, with this layout, the piezoelectric sensitive elements, which are sintered ceramic disks and therefore relatively fragile, can be easily damaged by crushing when the increase in the hydrostatic pressure causes them to be pressed against one another by bending the plates. It has been observed that their sensitivity decreases substantially with the hydrostatic pressure increase as a result of a phenomenon linked with the fastening thereof on a face that becomes convex.

Various piezoelectric detectors are described for example in the assignee's French patents 1,556,971 and 2,122,675 and in U.S. Pat. No. 4,336,639.

SUMMARY OF THE INVENTION

The vibration detector according to the invention pressure variations while avoiding the drawbacks of the prior solutions.

The invention comprises at least one detection unit including at least one supporting plate provided with a flexible central part and a reinforced peripheral part, and at least one sensitive element associated with electrodes, that is fastened to the central part of the supporting plate on a face thereof that becomes concave when it is subjected to an increase in the static pressure prevailing in a inner cavity of the detector unit, and electric conductors connected to the electrodes of each sensitive element.

The vibration detector according to the invention comprises a rigid housing provided with the inner cavity filled with a liquid, defined by a flexible wall in contact with the inner cavity and by the face of each of the supporting plates.

The vibration detector preferably comprises a second sensitive element associated with the central part of a second supporting plate, on a face that also becomes concave when the static pressure in the interior cavity increases, the inner cavity of the rigid housing also being defined by the face of the second supporting plate.

According to an embodiment, the housing comprises a ring closed at each of its opposite ends by a ring end, one of the ring ends at least serving as a support for the reinforced peripheral part of a supporting plate, the outer wall of the ring being provided with at least one port of sufficient cross section in order not to adversly affect the signals to be measured, that communicate with the inner cavity, and a sheath made of a flexible material for isolating the inner cavity from the outside environment.

The outer section of each reinforced part is for example substantially equal to the inner section of the ring. The detector comprises a seal means for isolating the rear face of each supporting plate from the inner cavity.

Each ring end is preferably suited to limit the bending of the flexible central parts of each supporting plate.

With such a layout, the sensitive elements are protected against accidental crushing and against any degraded performance linked with the direct contact with the oustide environment. The sensitivity of the sensitive elementsdoes not suffer from the static pressure variations since they are fastened to an inner face of the supporting plates.

BRIEF DESCRIPTION OF THE DRAWINGS

A non limiting embodiment of the vibration detector according to the invention is described in detail hereafter, with reference to the accompanying drawings in which:

FIG. 1 shows a cross-section of the housing of the detector with two plates and two sensitive elements, and FIG. 2 shows a longitudinal section of the same housing.

DESCRIPTION OF THE PREFERRED EMBODIMENT

The vibration detector of the invention comprises a housing 1 having consisting of a cylindrical ring 2 closed at its two opposite ends by two ring ends 3 and 4. It includes two supporting plates 5 each provided with a flexible central part 6 and with a reinforced peripheral part 7 whose outer section is substantially equal to the inner section of ring 2. The reinforced peripheral parts 7 of the two supporting plates 5 rest respectively against the two ends 3, 4. The space between each end 3 and 4 and the inner wall of the corresponding central part 6 is so selected that the bending of supporting plate 5 remains within its elastic deformation limits.

The inner wall of ring 2 and the two supporting plates 5 define an inner cavity 8. Two piezoelectric sensitive elements 9, provided each with electrodes on either side are fastened to the central part 6 respectively of the two supporting plates 5 on the side of inner cavity 8. Several ports 10 are provided in the outer wall of ring 2, at the level of inner cavity 8. The ring is externally covered with a sheath made from an elastic material 11 that is held by seal rings 12.

Seals 13 are placed between each end 3 and 4 and the reinforced peripheral part 7 in order to isolate the rear face of each supporting plate 5 from the inner cavity 8.

A port closed by a cap 14 is provided through the wall of ring 2, allowing inner cavity 8 to be filled with a liquid such as oil for example. Ring 2 is also provided with at least one sealed duct 15 for the passage of conducting wires 16 connected internally to the pair of electrodes of the two sensitive disks 9.

Without departing from the scope of the invention, each piezoelectric disk can be replaced by any other sensitive element suited to detect vibrations, or several pairs of supporting plates 5 associated each with sensitive elements 9 can be included in a tubular element of greater length.

I claim:

1. A vibration sensor for sensing pressure variations in an outside medium comprising:

a rigid housing having a cavity filled with a liquid; and at least one sensing unit within the housing in fluid communication with the liquid in the cavity, each sensing unit including a supporting plate provided with a flexible central portion and a stationary reinforced peripheral portion and having a face which is within the cavity and is part of the flexible central portion on which is disposed a pressure sensing element, the cavity being provided with at least two flexible walls, a first of the at least two flexible walls being a portion of a wall in contact with the outside medium and a second of the at least two flexible walls being in the flexible central portion, the face deforming concavely outward from the cavity in response to a static pressure increase in the outside medium coupled through the first portion of the wall to the liquid.

2. A vibration sensor in accordance with claim 1, further comprising:

another pressure sensitive element in fluid communication through the portion of the wall to the liquid;

another supporting plate provided with another flexible central portion and another stationary reinforced peripheral portion and having another face which is within the cavity and is part of the another flexible central portion on which is disposed another pressure sensing element, the inner cavity being provided with a third flexible wall which is in another flexible central portion, the another face also deforming concavely outward in response to the static pressure increase in the outside medium coupled through the first portion of the wall to the liquid.

3. A vibration sensor in accordance with claim 1, wherein the rigid housing comprises:

a ring with an inner section which contains the cavity, the ring being closed at each of opposite ends therein by a ring end, at least one of the ring ends supporting the reinforced peripheral portion of the supporting plate, an outer wall of the ring being provided with at least one port communicating with the inner cavity, and a flexible sheath isolating the inner cavity from the outside medium.

4. A vibration sensor in accordance with claim 2, wherein the rigid housing comprises:

a ring with an inner section which contains the cavity, the ring being closed at each of opposite ends therein by a ring end, the ring ends respectively supporting the reinforced peripheral portion of the supporting plate and the another reinforced peripheral portion of the another supporting plate, an outer wall of the ring being provided with at least one port communicating with the inner cavity, and a flexible sheath isolating the inner cavity from the outside medium.

5. A vibration sensor as recited in claim 1, further comprising:

a seal for sealing a face, opposed to the face on which the pressure sensing element is disposed, from the cavity.

6. A vibration sensor as recited in claim 2, further comprising:

a seal for sealing a face, opposed to the face on which the pressure sensing element is disposed, from the cavity.

7. A vibration sensor as recited in claim 3, wherein:

an outer section of each stationary reinforced peripheral portion is substantially equal to the inner section of the ring; and a seal for sealing a face, opposed to the face on which the pressure sensing element is disposed, from the cavity.

8. A vibration sensor as recited in claim 4, wherein:

an outer section of each stationary reinforced peripheral portion is substantially equal to the inner section of the ring; and a seal for sealing a face, opposed to the face on which the pressure sensing element is disposed, from the cavity.

9. A vibration sensor in accordance with claim 3, wherein:

each end ring limits the deforming of one flexible central portion.

10. A vibration sensor in accordance with claim 4, wherein:

each end ring limits the deforming of one flexible central portion.

11. A vibration sensor in accordance with claim 1, further comprising:

a port for filling the inner cavity with the liquid.

12. A vibration sensor in accordance with claim 2, further comprising:

a port for filling the inner cavity with the liquid.

13. A vibration sensor in accordance with claim 3, further comprising:

a port for filling the inner cavity with the liquid.

14. A vibration sensor in accordance with claim 1, further comprising:

at least one sealed duct disposed in the rigid housing for conveying electrical conductors from outside the cavity to electrodes of the at least one pressure sensing element inside the cavity.

15. A vibration sensor in accordance with claim 2, further comprising:

at least one sealed duct disposed in the rigid housing for conveying electrical conductors from outside the cavity to electrodes of the at least one pressure sensing element inside the cavity.

16. A vibration sensor in accordance with claim 3, further comprising:

at least one sealed duct disposed in the rigid housing for conveying electrical conductors from outside the cavity to electrodes of the at least one pressure sensing element inside the cavity.

17. A vibration sensor in accordance with claim 4, further comprising:

at least one sealed duct disposed in the rigid housing for conveying electrical conductors from outside the cavity to electrodes of the at least one pressure sensing element inside the cavity.

18. A vibration sensor in accordance with claim 5, further comprising:

at least one sealed duct disposed in the rigid housing for conveying electrical conductors from outside the cavity to electrodes of the at least one pressure sensing element inside the cavity.

19. A vibration sensor in accordance with claim 6, further comprising:

at least one sealed duct disposed in the rigid housing for conveying electrical conductors from outside the cavity to electrodes of the at least one pressure sensing element inside the cavity.

20. A vibration sensor in accordance with claim 7, further comprising:

at least one sealed duct disposed in the rigid housing for conveying electrical conductors from outside the cavity to electrodes of the at least one pressure sensing element inside the cavity.

21. A vibration sensor in accordance with claim 8, further comprising:

at least one sealed duct disposed in the rigid housing for conveying electrical conductors from outside the cavity to electrodes of the at least one pressure sensing element inside the cavity.

22. A vibration sensor in accordance with claim 9, further comprising:

at least one sealed duct disposed in the rigid housing for conveying electrical conductors from outside the cavity to electrodes of the at least one pressure sensing element inside the cavity.

23. A vibration sensor in accordance with claim 10, further comprising:

at least one sealed duct disposed in the rigid housing for conveying electrical conductors from outside the cavity to electrodes of the at least one pressure sensing element inside the cavity.

24. A vibration sensor in accordance with claim 11, further comprising:

at least one sealed duct disposed in the rigid housing for conveying electrical conductors from outside the cavity to electrodes of the at least one pressure sensing element inside the cavity.

25. A vibration sensor in accordance with claim 12, further comprising:

at least one sealed duct disposed in the rigid housing for conveying electrical conductors from outside the cavity to electrodes of the at least one pressure sensing element inside the cavity.

26. A vibration sensor in accordance with claim 13, further comprising:

at least one sealed duct disposed in the rigid housing for conveying electrical conductors from outside the cavity to electrodes of the at least one pressure sensing element inside the cavity.

27. A vibration sensor in accordance with claim 1, wherein:

the rigid housing comprises a tubular element.

* * * * *